(12) United States Patent
Chen

(10) Patent No.: US 11,290,447 B2
(45) Date of Patent: Mar. 29, 2022

(54) FACE VERIFICATION METHOD AND DEVICE

(71) Applicant: TENCENT TECHNOLOGY (SHENZHEN) COMPANY LIMITED, Guangdong (CN)

(72) Inventor: Yong Jun Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 436 days.

(21) Appl. No.: 16/227,669

(22) Filed: Dec. 20, 2018

(65) Prior Publication Data

US 2019/0149543 A1 May 16, 2019

Related U.S. Application Data

(63) Continuation of application No. PCT/CN2017/107637, filed on Oct. 25, 2017.

(30) Foreign Application Priority Data

Oct. 27, 2016 (CN) .......................... 201610952328.2

(51) Int. Cl.
*H04L 29/06* (2006.01)
*G06K 9/00* (2006.01)
*G06F 21/32* (2013.01)

(52) U.S. Cl.
CPC .......... *H04L 63/0861* (2013.01); *G06F 21/32* (2013.01); *G06K 9/00288* (2013.01); *H04L 63/0853* (2013.01)

(58) Field of Classification Search
CPC . H04L 63/0861; H04L 63/0853; G06F 21/32; G06K 9/00288
See application file for complete search history.

(56) References Cited

U.S. PATENT DOCUMENTS 5,793,868 A * 8/1998 Micali .................. H04L 9/3268
380/28
6,898,709 B1 * 5/2005 Teppler ................. H04L 9/3263
713/178
(Continued)

FOREIGN PATENT DOCUMENTS

CN 103179098 A 6/2013
CN 103914748 A 7/2014
(Continued)

OTHER PUBLICATIONS

Espacenet Translation of CN-105790948-A (Year: 2016).*
(Continued)

*Primary Examiner* — Luu T Pham
*Assistant Examiner* — James J Wilcox
(74) *Attorney, Agent, or Firm* — Sughrue Mion, PLLC

(57) ABSTRACT

A face authentication method includes receiving, from a first user terminal, a user account and a face image, obtaining a reference image corresponding to the user account, the reference image being prestored, and determining a second user terminal for helping the first user terminal complete face authentication of the face image with the reference image, the second user terminal being in a state of waiting to receive a first authentication code for the second user terminal to complete identity authentication of the first user terminal. The method further includes generating the first authentication code, sending, to the second user terminal, the first authentication code, the face image, and the reference image, and receiving, from the second user terminal, a result of the face authentication of the face image with the reference image, the result indicating whether the face authentication succeeds.

14 Claims, 10 Drawing Sheets

(56) References Cited

U.S. PATENT DOCUMENTS

| | | | |
|---|---|---|---|
| 9,622,079 B2* | 4/2017 | Giordano | H04L 63/0861 |
| 2005/0154879 A1* | 7/2005 | Engberg | H04L 9/3247 |
| | | | 713/157 |
| 2006/0158307 A1 | 7/2006 | Lee et al. | |
| 2007/0070891 A1* | 3/2007 | Zheng | H04L 47/70 |
| | | | 370/229 |
| 2007/0200916 A1 | 8/2007 | Han | |
| 2009/0268009 A1* | 10/2009 | Oya | H04L 12/1822 |
| | | | 348/14.09 |
| 2011/0135166 A1* | 6/2011 | Wechsler | G06K 9/627 |
| | | | 382/118 |
| 2011/0135168 A1* | 6/2011 | Hosoi | G06K 9/00288 |
| | | | 382/118 |
| 2011/0248851 A1* | 10/2011 | Pham | G07C 9/257 |
| | | | 340/572.1 |
| 2012/0070041 A1* | 3/2012 | Wang | G06F 21/32 |
| | | | 382/118 |
| 2012/0134547 A1* | 5/2012 | Jung | G06K 9/00832 |
| | | | 382/118 |
| 2012/0293642 A1* | 11/2012 | Berini | G06K 9/00154 |
| | | | 348/77 |
| 2013/0015946 A1* | 1/2013 | Lau | G06F 21/32 |
| | | | 340/5.2 |
| 2013/0223699 A1* | 8/2013 | Nagashima | G06K 9/00221 |
| | | | 382/118 |
| 2013/0322705 A1* | 12/2013 | Wong | G06F 21/40 |
| | | | 382/118 |
| 2013/0342702 A1* | 12/2013 | Zhang | G06K 9/2018 |
| | | | 348/164 |
| 2014/0037155 A1* | 2/2014 | Faria | G07C 9/37 |
| | | | 382/118 |
| 2014/0169643 A1* | 6/2014 | Todoroki | G06K 9/00248 |
| | | | 382/118 |
| 2014/0283014 A1* | 9/2014 | Tse | G06F 21/316 |
| | | | 726/19 |
| 2014/0341444 A1* | 11/2014 | Hou | G06F 21/32 |
| | | | 382/118 |
| 2014/0341445 A1* | 11/2014 | Yu | G06K 9/00275 |
| | | | 382/118 |
| 2015/0154392 A1* | 6/2015 | Bao | G06F 21/36 |
| | | | 726/19 |
| 2015/0269374 A1* | 9/2015 | Fan | G06F 21/34 |
| | | | 455/411 |
| 2015/0310259 A1* | 10/2015 | Lau | G06K 9/00288 |
| | | | 382/118 |
| 2015/0362986 A1* | 12/2015 | Lee | G06F 1/3231 |
| | | | 382/118 |
| 2015/0379332 A1* | 12/2015 | Matsunaga | G06K 9/00268 |
| | | | 348/77 |
| 2016/0042308 A1* | 2/2016 | Aptakin | G06Q 10/063114 |
| | | | 705/7.15 |
| 2016/0063235 A1* | 3/2016 | Tussy | G06Q 20/40145 |
| | | | 726/6 |
| 2016/0070956 A1* | 3/2016 | Lu | G06K 9/00268 |
| | | | 382/118 |
| 2016/0087962 A1* | 3/2016 | Cao | G06F 21/00 |
| | | | 726/7 |
| 2016/0092724 A1* | 3/2016 | Jeong | G06K 9/00288 |
| | | | 348/77 |
| 2016/0104034 A1* | 4/2016 | Wilder | G06K 9/00288 |
| | | | 382/118 |
| 2016/0110533 A1* | 4/2016 | Berini | G06K 9/00912 |
| | | | 348/150 |
| 2016/0132690 A1* | 5/2016 | McWhirter | G06F 21/6218 |
| | | | 726/28 |
| 2016/0140405 A1* | 5/2016 | Graumann | G06K 9/00288 |
| | | | 382/118 |
| 2016/0154991 A1* | 6/2016 | Berini | G06K 9/00013 |
| | | | 382/116 |
| 2016/0234023 A1* | 8/2016 | Mozer | H04L 63/0861 |
| 2016/0335480 A1* | 11/2016 | Lu | G06K 9/00228 |
| 2016/0350611 A1* | 12/2016 | Zhang | G06K 9/00288 |
| 2016/0371535 A1* | 12/2016 | Li | G06K 9/00288 |
| 2016/0373432 A1* | 12/2016 | Engberg | H04L 63/0823 |
| 2016/0373437 A1* | 12/2016 | He | H04L 63/0861 |
| 2017/0024608 A1* | 1/2017 | Kons | G06K 9/00268 |
| 2017/0031953 A1* | 2/2017 | Tang | G06F 16/5838 |
| 2017/0039418 A1* | 2/2017 | Wang | G06K 9/00288 |
| 2017/0061202 A1* | 3/2017 | Shreve | G06K 9/00315 |
| 2017/0076143 A1* | 3/2017 | Sapiro | G06K 9/627 |
| 2017/0083754 A1* | 3/2017 | Tang | G06K 9/00288 |
| 2017/0091533 A1* | 3/2017 | Mardikar | G06F 21/32 |
| 2017/0118207 A1* | 4/2017 | Madhu | G06K 9/00979 |
| 2017/0124385 A1* | 5/2017 | Ganong | G06F 16/50 |
| 2017/0147868 A1* | 5/2017 | Sun | G06K 9/00288 |
| 2017/0149517 A1* | 5/2017 | Xie | H04H 60/15 |
| 2017/0185760 A1* | 6/2017 | Wilder | G06K 9/00906 |
| 2017/0235934 A1 | 8/2017 | Feng et al. | |
| 2017/0289127 A1* | 10/2017 | Hendrick | H04W 12/068 |
| 2018/0068173 A1* | 3/2018 | Kolleri | G06F 16/29 |
| 2018/0096196 A1* | 4/2018 | Gordon | G06T 7/20 |
| 2018/0211098 A1* | 7/2018 | Tanaka | G06K 9/00288 |
| 2018/0314812 A1* | 11/2018 | Qin | G06F 21/36 |

FOREIGN PATENT DOCUMENTS

| | | | | |
|---|---|---|---|---|
| CN | 104540032 A | | 4/2015 | |
| CN | 105553919 A | | 5/2016 | |
| CN | 105790948 A | * | 7/2016 | G06K 9/00 |
| CN | 105790948 A | | 7/2016 | |
| CN | 105913583 A | | 8/2016 | |
| WO | 2014143070 A1 | | 9/2014 | |

OTHER PUBLICATIONS

Tao et al—"Verifying a User in a Personal Face Space," ICARCV 2006, IEEE, pp. 1-4 (Year: 2006).*

Written Opinion of the International Searching Authority in International Application No. PCT/CN2017/107637, dated Jan. 31, 2018.

Communication dated Oct. 13, 2020 from the State Intellectual Property Office of the P.R. of China in Application No. 201610952328.2.

International Search Report for PCT/CN2018/107637 dated Jan. 31, 2018 (PCT/ISA/210).

Communication dated Apr. 6, 2021, from the China National Intellectual Property Administration in application No. 201610952328.2.

* cited by examiner

FACE VERIFICATION METHOD AND DEVICE

CROSS-REFERENCE TO RELATED APPLICATIONS

This application is a continuation of International Patent Application No. PCT/CN2017/107637 filed on Oct. 25, 2017, which claims priority from Chinese Patent Application No. 201610952328.2, filed in the Chinese Patent Office on Oct. 27, 2016, and entitled "IDENTITY AUTHENTICATION METHOD AND APPARATUS," the disclosures of which are incorporated herein by reference in their entireties.

BACKGROUND

1. Field

Methods and apparatuses consistent with embodiments relate to the security authentication field, and in particular, to a face authentication method and a face authentication apparatus.

2. Description of Related Art

Biometric authentication technologies are the most convenient and safe identity identification technologies currently. Persons are identified by using the biometric authentication technologies and no other identifiers may be required. In the biometric authentication technologies, identity identification is performed by using physiological characteristics and behavior characteristics of persons. Fingerprint identification, face identification, iris identification, gait identification, and the like may be included. Face identification is a big hotspot in the current biometric authentication field. Compared with current widely applied fingerprint identification technologies, the biometric authentication technologies have significant advantages such as intuition, convenience, non-contact, friendliness, and high user acceptance.

As a common biometric characteristic, faces have been widely applied to fields such as financial payment and security. Two-dimensional face identification is based on a single face planar image. Generally, a face planar image is collected by using a camera; face swiping, eye positioning, and feature extraction are performed; then comparison with a template library is performed; and finally identification and determination are made.

SUMMARY

According to embodiments, there is provided a face authentication method being performed by at least one processor of a server, and the method including receiving, from a first user terminal, a user account and a face image, obtaining a reference image corresponding to the user account, the reference image being prestored, and determining a second user terminal for helping the first user terminal complete face authentication of the face image with the reference image, the second user terminal being in a state of waiting to receive a first authentication code for the second user terminal to complete identity authentication of the first user terminal. The method further includes generating the first authentication code, sending, to the second user terminal, the first authentication code, the face image, and the reference image, receiving, from the second user terminal, a result of the face authentication of the face image with the reference image, the result indicating whether the face authentication succeeds, and determining, based on the result of the face authentication, whether the face authentication succeeds.

According to embodiments, there is provided a face authentication apparatus including at least one memory configured to store computer program code, and at least one processor configured to access the at least one memory and operate according to the computer program code. The computer program code includes receiving code configured to cause the at least one processor to receive, from a first user terminal, a user account and a face image, and determining code configured to cause the at least one processor to obtain a reference image corresponding to the user account, the reference image being prestored, and determine a second user terminal for helping the first user terminal complete face authentication of the face image with the reference image, the second user terminal being in a state of waiting to receive a first authentication code for the second user terminal to complete identity authentication of the first user terminal. The apparatus further includes authentication code generating code configured to cause the at least one processor to generate the first authentication code, sending code configured to cause the at least one processor to send, to the second user terminal, the first authentication code, the face image, and the reference image, and authentication code configured to cause the at least one processor to receive, from the second user terminal, a result of the face authentication of the face image with the reference image, the result indicating whether the face authentication succeeds, and determine, based on the result of the face authentication, whether the face authentication succeeds.

According to embodiments, there is provided a non-transitory computer-readable storage medium storing instructions that cause at least one processor of a server to receive, from a first user terminal, a user account and a face image, obtain a reference image corresponding to the user account, the reference image being prestored, and determine a second user terminal for helping the first user terminal complete face authentication of the face image with the reference image, the second user terminal being in a state of waiting to receive a first authentication code for the second user terminal to complete identity authentication of the first user terminal. The instructions further cause the at least one processor to generate the first authentication code, send, to the second user terminal, the first authentication code, the face image, and the reference image, receive, from the second user terminal, a result of the face authentication of the face image with the reference image, the result indicating whether the face authentication succeeds, and determine, based on the result of the face authentication, whether the face authentication succeeds.

DESCRIPTION OF EMBODIMENTS

To enable a person skilled in the art to better understand the technical solutions of this application, the following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

In the specification, claims, and accompanying drawings of this application, the terms "first," "second," and so on are intended to distinguish between similar objects rather than describe a specific order. Data used in this way is exchangeable in a proper case, so that the embodiments described herein of this application can be implemented in another order except those shown or described herein. In addition, the terms "include," "have," and any variants thereof are intended to cover a non-exclusive inclusion. For example, a process, method, system, product, or device that includes a series of steps or units is not necessarily limited to those steps or units specified expressly, but may include other steps or units not specified expressly or inherent to such a process, method, system, product, or device.

Embodiments of this application provide a face authentication method and apparatus.

Figure 1:
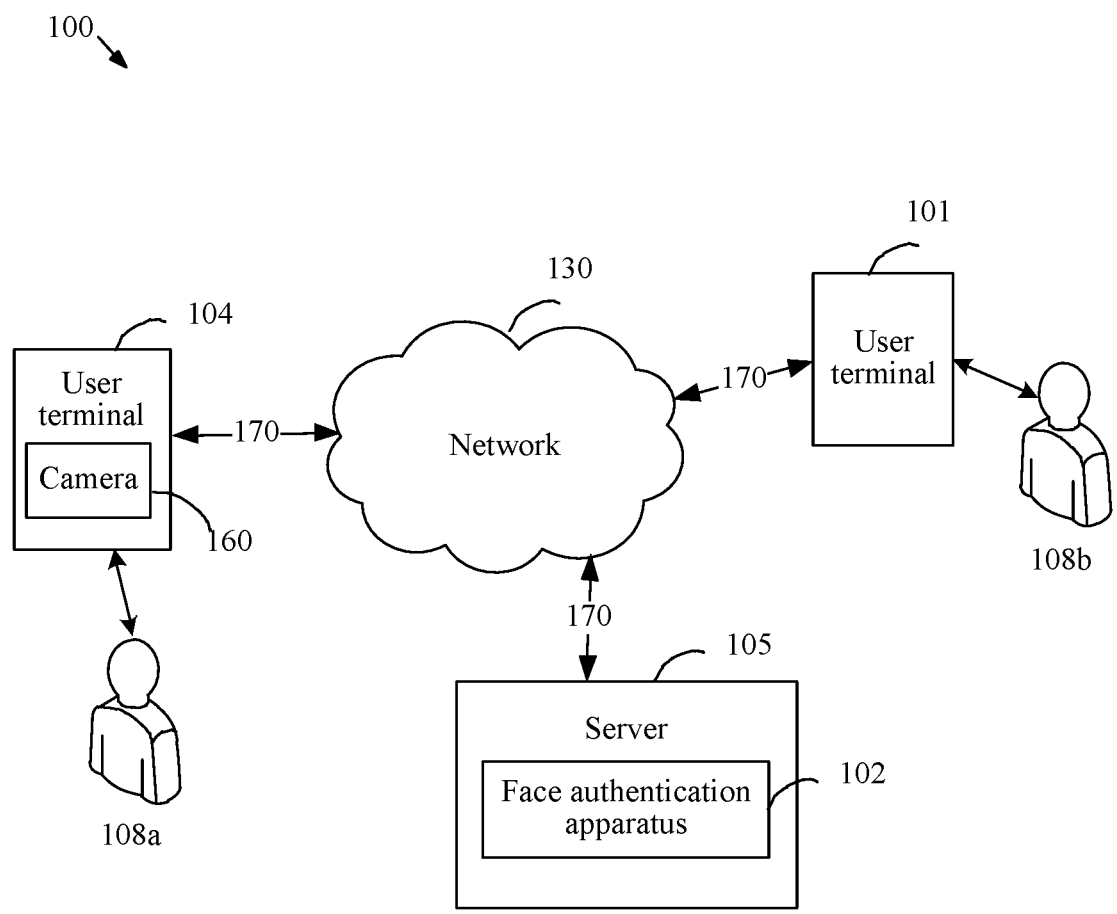
FIG. 1 is a schematic diagram of an implementation environment of a face authentication method and apparatus according to an embodiment.

FIG. 1 is a schematic structural diagram of an implementation environment 100 of a face authentication method and apparatus according to an embodiment. The implementation environment includes at least two user terminals (a user terminal 104 and a user terminal 101) and a server 105 (including a face authentication apparatus 102). The user terminal 104 and the user terminal 101 respectively access the server 105 by using a network 130. The server 105 is configured to provide a data service to a user 108a and a user 108b, and maintains a database. The user terminal 104 includes a camera 160 configured to photograph a face image of the user 108a of the user terminal 104. The user terminal 101, the user terminal 104, the server 105, and the database communicate with and connected to each other by using a link 170.

In this embodiment of this application, it is assumed that the user 108a needs to perform face authentication, to complete an operation such as a login, payment, or authentication. In this case, the user terminal 104 photographs a face image of the user 108a by using the camera 160. The user terminal 104 sends, to the server 105, the photographed face image and a user account number that is input by the user 108a.

The server 105 obtains, by querying the database according to the received user account number, a reference image corresponding to the user account number that is prestored in the database. The server 105 determines the user 108b that is in a state of waiting to receive an authentication code from the server 105, generates the authentication code for the user 108b, and sends the authentication code, the face image, and the reference image to the user terminal 101 of the user 108b.

The user terminal 101 receives the authentication code, the face image, and the reference image that are sent by the server 105; completes authentication of the user terminal 101 according to the authentication code, and obtains an authentication result according to the face image and the reference image, in which the authentication result indicates whether persons in the face image and the reference image are the same; and feeds back the authentication result to the server.

After receiving the authentication result fed back by the user terminal 101, the server 105 determines, according to the authentication result, whether the authentication on the user 108a succeeds.

In the implementation environment, there may be one or more servers 105. When face authentication needs to be performed on a relatively large quantity of user terminals 104, face authentication apparatuses 102 in the plurality of servers 105 may perform operations in parallel, thereby improving a face authentication speed.

The database stores information such as the reference image, the user account number, and a corresponding password.

During registration, the user terminal 104 obtains at least one face image, and sends the collected at least one face image to the server 105. The server 105 uses the received face image as the reference image, and associatively save the reference image and the login account of the user 108a in the database. In some embodiments, the at least one face image obtained by the user terminal 104 may be a face image photographed by using the camera 160, or may be a face image read from a storage medium of the user terminal 104. The at least one face image may include a plurality of face images of the user 108a in different angles.

In some embodiments, the database may be independent of the server 105. Alternatively, the database may be configured in the server 105, so that the face authentication apparatus 102 may directly obtain data from the local database.

In some embodiments, the link 170 may be any communications link, or may be implemented by using any network protocol, including various wired or wireless protocols. For example, the link 170 may be any one or a combination of the following various connection manners: a wired connection, an internal connection, a wireless connection, and the like.

The network 130 may include a local area network (LAN) and a wide area network (WAN) such as the Internet. Any known network protocol, including various wired or wireless protocols, may be used to implement the network 130.

In some embodiments, examples of the user terminal 101 and the user terminal 104 include but are not limited to a smartphone, a palmtop computer, a wearable computing device, a wearable computing device, a personal digital assistant (PDA), a tablet computer, a notebook computer, or a combination of any two or more of these data processing devices and another data processing device.

Figure 2:
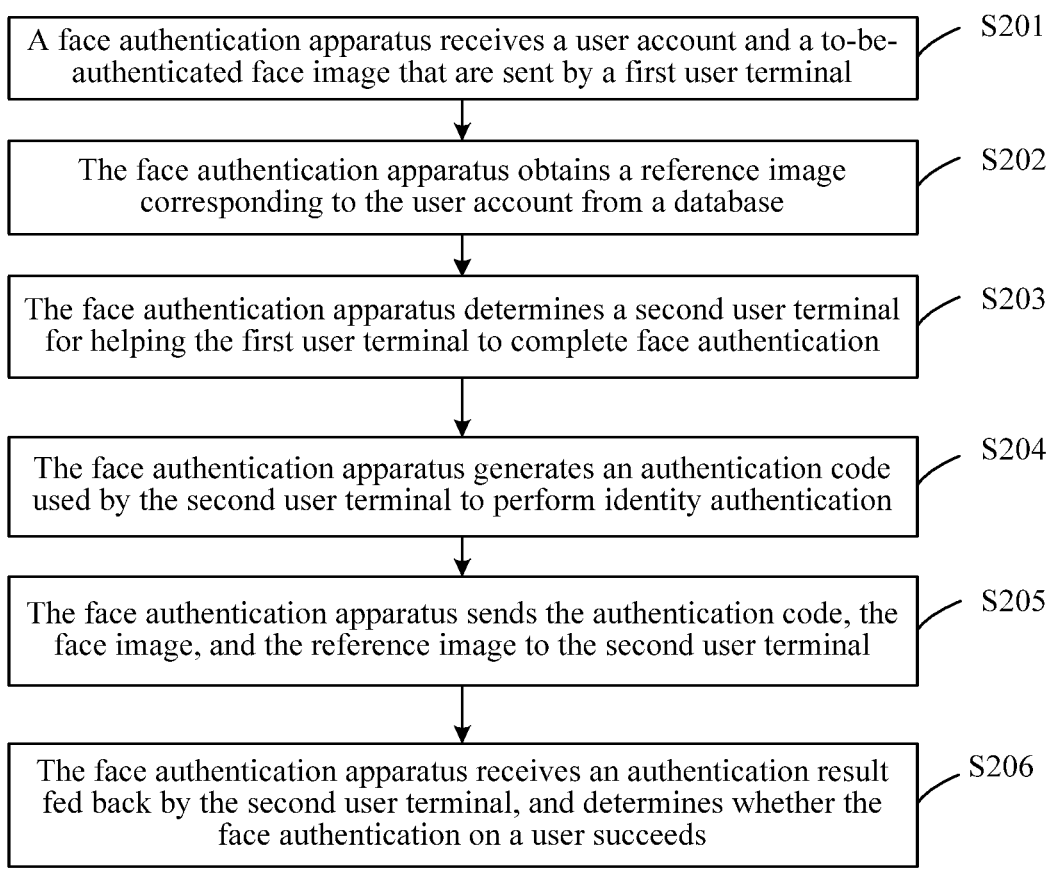
FIG. 2 is a flowchart of a face authentication method according to an embodiment.

FIG. 2 is a flowchart of a face authentication method according to an embodiment. The method may be performed by the face authentication apparatus 102 shown in FIG. 1. As shown in FIG. 2, the method includes the following steps:

Step S201. The face authentication apparatus receives a user account and a to-be-authenticated face image that are sent by a first user terminal.

When a first user of the first user terminal needs to complete a login, payment, or another operation, the first user terminal receives a user account input by the first user, photographs a face image of the first user, and sends the user account and the photographed face image to the face authentication apparatus. The face authentication apparatus receives the user account and the face image that are sent by the first user terminal, to complete subsequent face authentication.

For example, for the login operation, the first user terminal displays a login page to the first user, receives the login account number input by the first user, and photographs a face image of the first user. The received login account number and the photographed face image are sent to the face authentication apparatus, to perform subsequent face authentication.

Step S202. The face authentication apparatus obtains a reference image corresponding to the user account from a database.

After receiving the user account and the face image that are sent from the first user terminal, the face authentication apparatus searches, according to the user account, the database for the reference image corresponding to the user account.

In this embodiment of this application, the reference image is prestored in the database, and is a face image corresponding to the user account. The reference image may be a face image that is submitted by a user during registration and that is prestored in the first user terminal, or may be a face image that is collected by the first user terminal in real-time during user registration. The server correspondingly stores the reference image and the user account in the database.

Step S203. The face authentication apparatus determines a second user terminal for helping the first user terminal to complete face authentication.

In this embodiment of this application, the second user terminal is a user terminal in a state of waiting the server to send an authentication code. For example, the second user terminal sends a user request message to the server, and is waiting for the server to return the authentication code used for identity authentication, to complete an operation such as a login or payment.

In this embodiment of this application, the authentication code may be a character authentication code or may be an image authentication code. A specific manner of the authentication code is not limited in this embodiment of this application.

In this embodiment of this application, for all the second user terminals that have sent request messages and to which the server does not return the authentication code, the second user terminals may be sorted in chronological order of the request messages sent by the second user terminals, and a preset quantity of second user terminals that send request message earliest may be selected as second user terminals for helping the first user terminal complete the face authentication.

Herein, the selected preset quantity of second user terminals may be one or more.

In some embodiments, if there is no second user terminal waiting for the server to return the authentication code currently, the server may complete the face authentication on the first user terminal by using another method. For example, a face authentication algorithm of the server may be enabled to determine the face image and the prestored reference image that are sent by the first user terminal, and determine, according to a determining result, whether the authentication on the first user terminal succeeds. Alternatively, the user may be prompted to input a password to complete the authentication.

In this embodiment of this application, step S202 and step S203 may be performed at the same time or in any sequence.

Step S204. The face authentication apparatus generates an authentication code used by the second user terminal to perform identity authentication.

In this embodiment of this application, after determining the second user terminal for helping the first user terminal complete the face authentication, the server generates the authentication code used by the second user terminal to perform the identity authentication.

Step S205. The face authentication apparatus sends the authentication code, the face image, and the reference image to the second user terminal.

In this embodiment of this application, the face authentication apparatus sends the generated authentication code in step S204, the received face image in step S201, and the reference image queried in step S202 to the second user terminal determined in step S203.

In some embodiments, the authentication code, the face image, and the reference image may be delivered to the second user terminal by using a message. Alternatively, the authentication code may be sent to the second user terminal first, and if the authentication performed by the second user terminal succeeds, the face image and the reference image are sent to the second user terminal.

Step S206: The face authentication apparatus receives an authentication result fed back by the second user terminal, and determines whether the face authentication on a user succeeds.

The face authentication apparatus receives the authentication result fed back by the second user terminal, and if the authentication result is that persons in the face image and the reference image are the same, it is determined that the authentication on the first user terminal succeeds; otherwise, it is determined that the authentication on the first user terminal fails.

For a case in which there is a plurality of second user terminals, statistics collection may be respectively performed on a quantity of authentication results indicating that persons in the face image and the reference image are the same and a quantity of authentication results indicating that persons in the face image and the reference image are different persons, and if the quantity of authentication results indicating that persons in the face image and the reference image are the same exceeds a preset ratio, it is determined that the authentication on the first user terminal succeeds.

The method provided in this embodiment of this application does not require a large quantity of manually annotated training samples, and is applicable to different scenarios. In different scenarios, neither training set adjusting nor retraining is required. Therefore, the authentication accuracy is high, and an authentication speed is fast.

Figure 3:
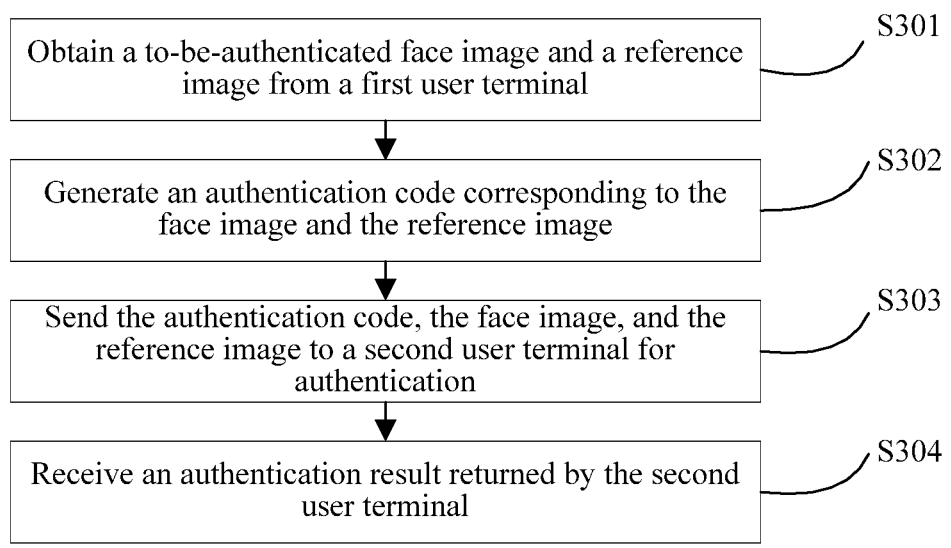
FIG. 3 is a flowchart of a face authentication method according to an embodiment.

FIG. 3 is a flowchart of a face authentication method according to an embodiment. The method may be applied to a face swiping login scenario. The method may be performed by the face authentication apparatus 102 shown in FIG. 1. Referring to FIG. 3, the method procedure includes the following steps.

Pre-registration includes the following steps. A user inputs registration information. The registration information includes a login account number and a corresponding reference image. The foregoing reference image may be a face image of the registered user that is collected during registration, or may be a face image submitted by the registered user to a registration system. The reference image is in one-to-one correspondence to the login account number, and the reference image is used as an image password of the login account number.

S301. Obtain a to-be-authenticated face image and a reference image from a first user terminal.

After a user inputs a login account number on the first user terminal, an image collection apparatus of the first user terminal performs face image collection for the first user. The image collection apparatus may be a camera. In addition, the corresponding reference image may be obtained by using an association mapping between the login account number and the reference image.

S302. Generate an authentication code corresponding to the face image and the reference image.

A character string authentication code is generated by an authentication code system, and the generated authentication code is configured corresponding to the foregoing obtained face image and reference image.

S303. Send the authentication code, the face image, and the reference image to a second user terminal for authentication.

A scenario in which the second user terminal is located is a scenario in which the second user terminal receives various authentication codes, for example, scenarios such as a system login, password payment, and real-name authentication. To complete a login task, a payment task, or an authentication task of the second user terminal, the second user terminal needs to receive the authentication code, the face image, and the reference image. First, a user of the second user terminal needs to input a character authentication code, and determines the face image and the reference image under the premise that the input authentication code is correct. A determining content is whether faces in the two images are the same, and if yes, an authentication result indicates that the authentication succeeds, or if not, an authentication result indicates that the authentication fails. If the character authentication code input by the user of the second user terminal is incorrect, no further determining needs to be performed on the face image and the reference image, or a determining result made by the second user terminal is discarded.

S304. Receive an authentication result returned by the second user terminal.

After receiving the authentication result returned by the second user terminal, a subsequent operation is generated. If the authentication result indicates that the authentication succeeds, the login of the user of the first user is successful. If the authentication result indicates that the authentication fails, the login of the user of the first user terminal is prevented.

To avoid instability of the authentication result caused by incorrect identification performed by a single user, an embodiment of this application provides a face authentication method based on a plurality of identification user terminals. The method may be applied to a real-name authentication scenario.

Figure 4:
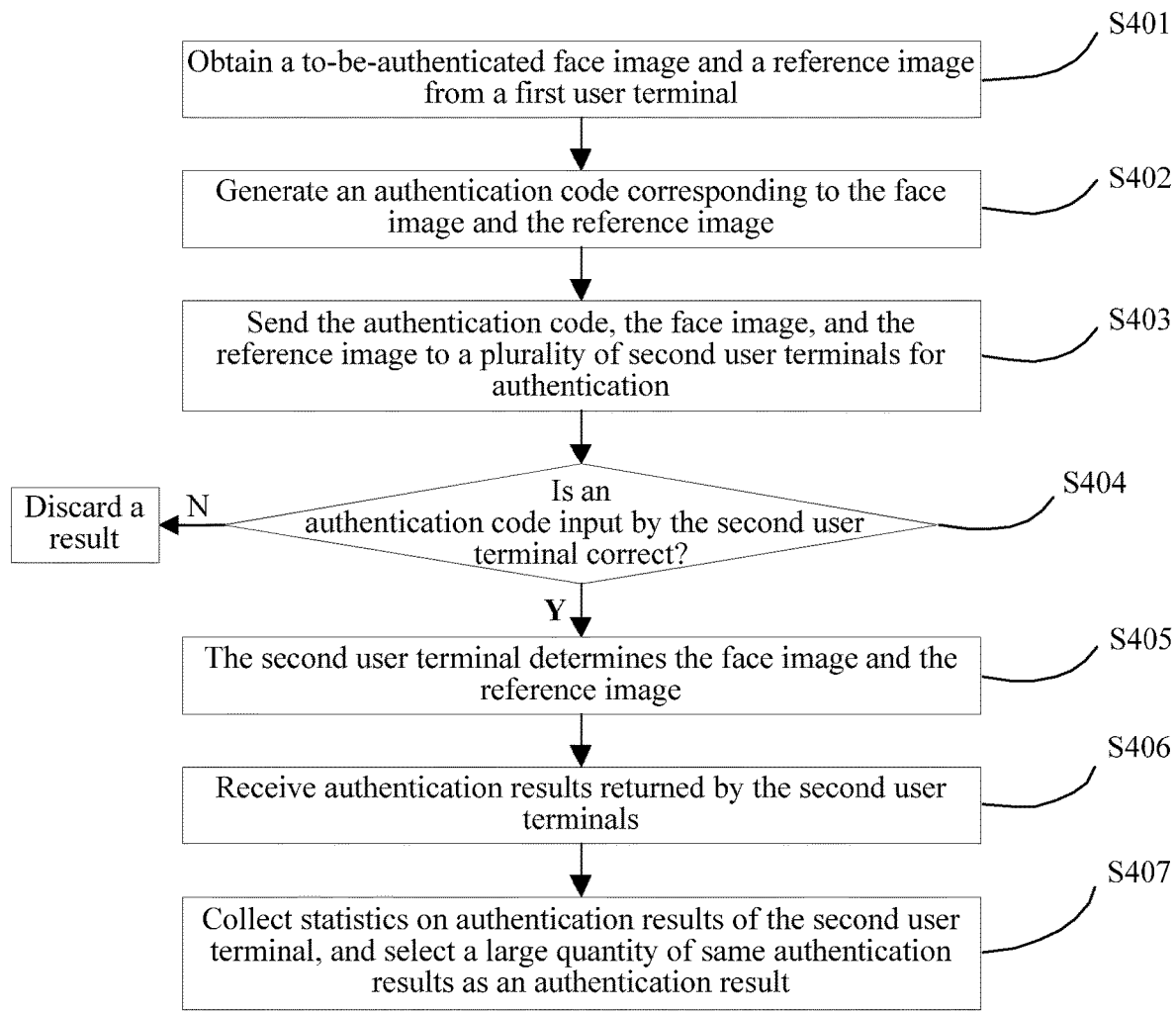
FIG. 4 is a flowchart of a face authentication method based on a plurality of identification user terminals according to an embodiment.

FIG. 4 is a flowchart of a face authentication method based on a plurality of identification user terminals according to an embodiment. Referring to FIG. 4, the method procedure includes:

Pre-registration includes the following steps. A user inputs registration information. The registration information includes an authentication account number and a corresponding reference image. The foregoing reference image may be a face image of the registered user that is collected during registration, or may be a face image submitted by the registered user to a registration system. The reference image is in one-to-one correspondence to the authentication account number, and the reference image is used as an image authentication password of the authentication account number.

S401. Obtain a to-be-authenticated face image and a reference image from a first user terminal.

After a user inputs an authentication account number on the first user terminal, an image collection apparatus of the first user terminal performs face image collection for the user. The image collection apparatus is a camera. In addition, the corresponding reference image may be obtained by using an association mapping between the authentication account number and the reference image.

S402. Generate an authentication code corresponding to the face image and the reference image.

A character string authentication code is generated by an authentication code system, and the generated authentication code is configured corresponding to the foregoing obtained face image and reference image.

S403. Send the authentication code, the face image, and the reference image to a plurality of second user terminals for authentication.

A scenario in which the plurality of second user terminals is located is a scenario in which the plurality of second user terminals receives various authentication codes, for example, scenarios such as a system login, password payment, and real-name authentication. The plurality of second user terminals may be located in a same scenario or may be located in different scenarios. To complete a login task, a payment task, or an authentication task of the second user terminal, the second user terminal needs to receive the authentication code, the face image, and the reference image.

S404. Determine whether an authentication code input by the second user terminal is correct. If the authentication code is correct, perform S405; otherwise, discard an authentication result made by the second user terminal.

The authentication code system receives the authentication code input by the second user terminal, and the authentication code system compares whether the authentication code input by the second user terminal and the generated character string authentication code are the same, and if yes, the authentication code is correct, or if not, the authentication code is incorrect. If the authentication code is incorrect, no further determining needs to be performed on the face image and the reference image, or a determining result made by the second user terminal is discarded.

S405. The second user terminal determines the face image and the reference image.

The face image and the reference image are determined under the premise that the input authentication code is correct. A determining content is whether faces in the two images are the same, and if yes, an authentication result indicates that the authentication succeeds, or if not, an authentication result indicates that the authentication fails.

S406. Receive authentication results returned by the second user terminals.

Each second user terminal returns an authentication result. A plurality of second user terminals returns a plurality of authentication results. The authentication result includes: the authentication succeeds and the authentication fails.

S407. Collect statistics on authentication results of the second user terminal, and select a large quantity of same authentication results as an authentication result.

Statistics collection is performed on a quantity of results indicating that the authentication succeeds and a quantity of results indicating that the authentication fails, and selection may be performed according to a rule of selecting a large quantity of authentication results, or selection may be performed according to a set quantity ratio. This is not specifically limited in this embodiment of this application.

After a final authentication result is selected, a subsequent operation is generated. If the authentication result indicates that the authentication succeeds, the authentication on the user of the first user terminal succeeds. If the authentication result indicates that the authentication fails, the authentication on the user of the first user terminal fails.

The face authentication technical solutions of this application may be independently used or may be used as a technology supplement of another authentication algorithm (such deep learning). To improve timeliness of an identification authentication process, an embodiment of this application provides a face authentication method with a set time threshold. The method may be applied to a face swiping payment scenario.

Figure 5:
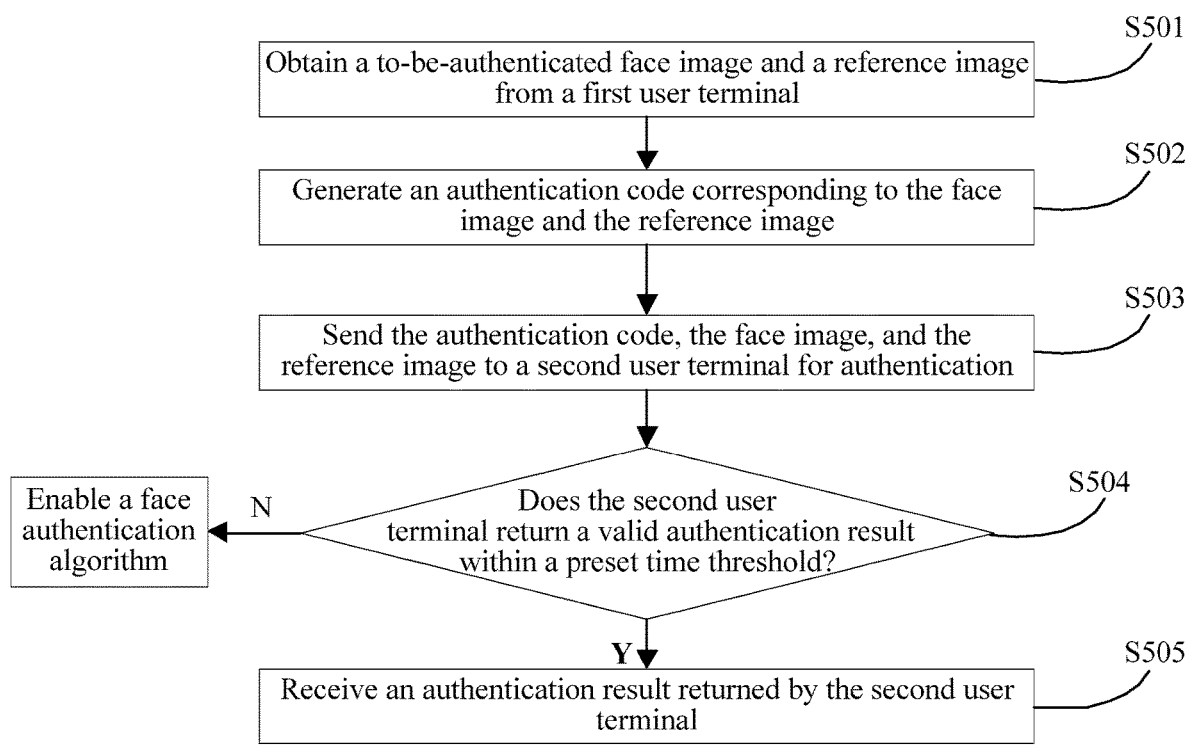
FIG. 5 is a flowchart of a face authentication method with a set time threshold according to an embodiment.
Figure 6:
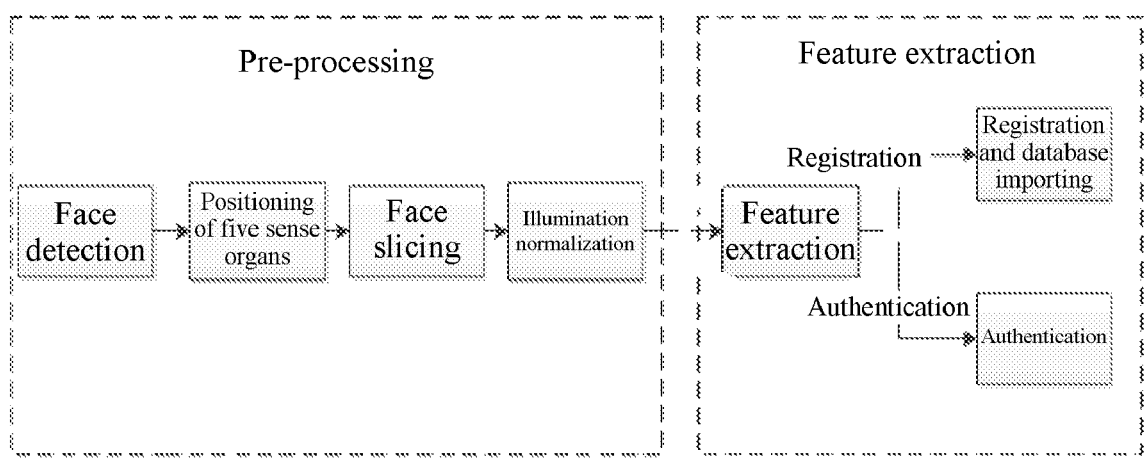
FIG. 6 is a schematic diagram of a face authentication algorithm according to an embodiment.

FIG. 5 is a flowchart of a face authentication method with a set time threshold according to an embodiment, and FIG. 6 is a schematic diagram of a face authentication algorithm according to an embodiment. Referring to the FIG. 5, the method procedure includes:

Pre-registration includes the following steps. A user inputs registration information. The registration information includes a payment account number and a corresponding reference image. The foregoing reference image may be a face image of the registered user that is collected during registration, or may be a face image submitted by the registered user to a registration system. The reference image is in one-to-one correspondence to the payment account number, and the reference image is used as an image authentication password of the payment account number.

S501. Obtain a to-be-authenticated face image and a reference image from a first user terminal.

After a user inputs a payment account number on the first user terminal, an image collection apparatus of the first user terminal performs face image collection for the user. The image collection apparatus is a camera. In addition, the corresponding reference image may be obtained by using an association mapping between the payment account number and the reference image.

S502. Generate an authentication code corresponding to the face image and the reference image.

A character string authentication code is generated by an authentication code system, and the generated authentication code is configured corresponding to the foregoing obtained face image and reference image.

S503. Send the authentication code, the face image, and the reference image to a second user terminal for authentication.

A scenario in which a plurality of second user terminals is located is a scenario in which the plurality of second user terminals receives various authentication codes, for example, scenarios such as a system login, password payment, and real-name authentication. To complete a login task, a payment task, or an authentication task of the second user terminal, the second user terminal needs to receive the character authentication code, the face image, and the reference image. The authentication code system receives the authentication code input by the second user terminal, and the authentication code system compares whether the authentication code input by the second user terminal and the generated character string authentication code are the same, and if yes, the authentication code is correct, or if not, the authentication code is incorrect. If the authentication code is incorrect, no further determining needs to be performed on the face image and the reference image, or a determining result made by the second user terminal is discarded. A process of performing the authentication by the second user terminal is as follows: the face image and the reference image are determined under the premise that the input authentication code is correct. A determining content is whether faces in the two images are the same, and if yes, an authentication result indicates that the authentication succeeds, or if not, an authentication result indicates that the authentication fails.

S504. Preset a time threshold, and determine whether the second user terminal returns an authentication result within the time threshold. If yes, perform S505; otherwise, enable a face authentication algorithm.

A face swiping payment speed of the first user terminal depends on an authentication speed of the second user terminal. However, the authentication speed of the second user terminal is limited by an environment or an application scenario, for example, an online user of the second user terminal is not in a scenario of receiving the authentication code, or the Internet is not smooth. Further, the authentication speed of the second user terminal is affected by a subjective factor of a user on the second user terminal, for example, the user of the second user terminal does not submit the authentication result in time. In conclusion, the time threshold needs to be set to ensure timeliness of face swiping payment of the first user terminal. Assuming that the set time threshold is 30 seconds, an authentication result returned by the second user terminal within 30 seconds is a valid result, and an authentication result returned by the second user terminal beyond 30 seconds is an invalid result. The valid result is used and the invalid result is discarded.

If a quantity of valid authentication results returned within a time threshold is 0, the face authentication algorithm is enabled to perform face payment authentication on the user of the first user terminal. A procedure of the face authentication algorithm is shown in FIG. 6. The procedure mainly includes two parts: pre-processing and feature extraction. The pre-processing part includes face image detection, positioning of five sense organs, face image slicing, and illumination normalization. The feature extraction part is implemented by using a deep convolutional network, and further includes registration and database importing and authentication.

S505. Receive the authentication result returned by the second user terminal.

Regardless of whether the second user terminal returns the valid authentication result within a time threshold, the user of the first user terminal finally receives the authentication result and generates a subsequent operation. If the authentication result indicates that the authentication succeeds, face swiping payment of the user of the first user terminal succeeds; and if the authentication result indicates that the authentication fails, face swiping payment of the user of the first user terminal fails.

To improve timeliness of an identification authentication process, an embodiment of this application provides a second face authentication method based on a time threshold. The method may be applied to a web page or an app login scenario.

Figure 7:
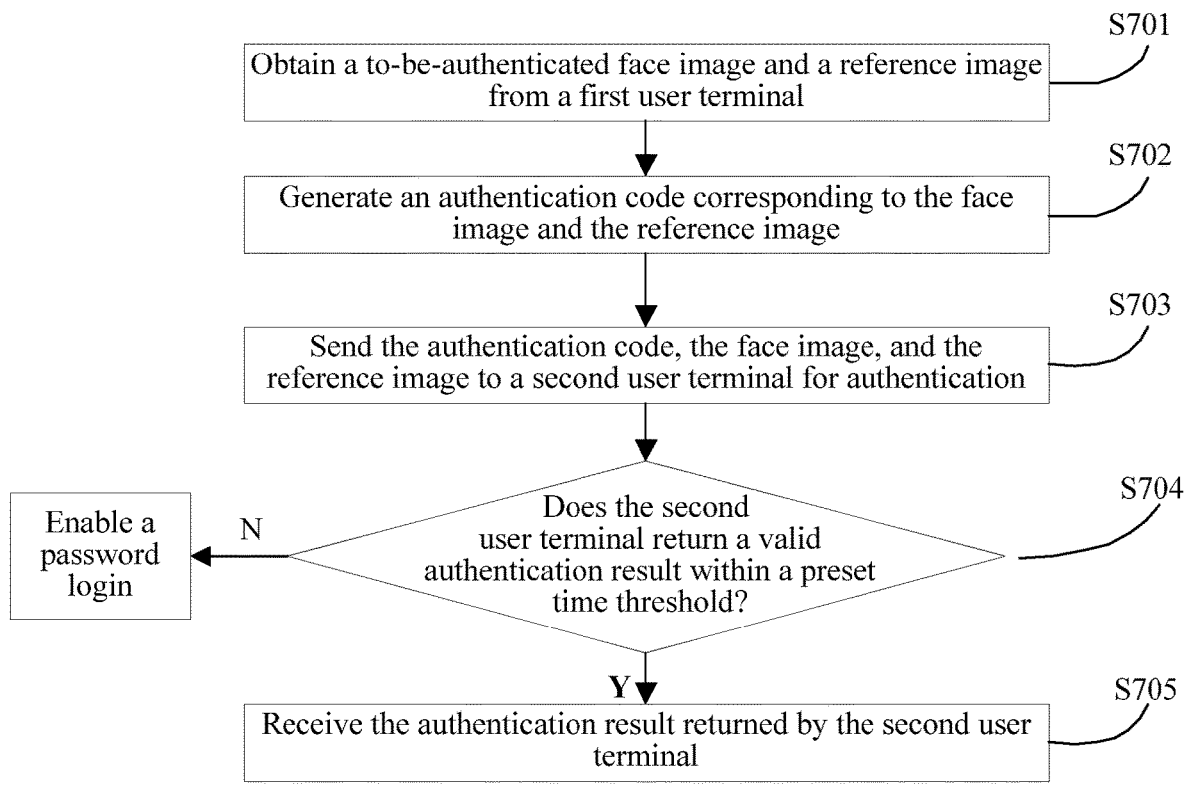
FIG. 7 is a flowchart of a face authentication method according to an embodiment.

FIG. 7 is a flowchart of a face authentication method according to an embodiment. Referring to FIG. 7, the method procedure includes:

Pre-registration includes the following steps. A user inputs registration information, in which the registration information includes a login account number and a corresponding registered face image; and registers with a login password. The registered face image is referred to as a reference image for short below. The reference image is in one-to-one correspondence to the login account number. The reference image is used as an image authentication password of the login account number. The login password is used as a character string authentication password of the login account number.

S701. Obtain a to-be-authenticated face image and a reference image from a first user terminal.

After a user inputs a login account number on the first user terminal, an image collection apparatus of the first user terminal performs face image collection for the user. The image collection apparatus is a camera. In addition, the corresponding reference image may be obtained by using an association mapping between the login account number and the reference image.

S702. Generate an authentication code corresponding to the face image and the reference image.

A character string authentication code is generated by an authentication code system, and the generated authentication code is configured corresponding to the foregoing obtained face image and reference image.

S703. Send the authentication code, the face image, and the reference image to a second user terminal for authentication.

A scenario in which a plurality of second user terminals is located is a scenario in which the plurality of second user terminals receives various authentication codes, for example, scenarios such as a system login, password payment, and real-name authentication. To complete a login task, a payment task, or an authentication task of the second user terminal, the second user terminal needs to receive the character authentication code, the face image, and the reference image. The authentication code system receives the authentication code input by the second user terminal, and the authentication code system compares whether the authentication code input by the second user terminal and the generated character string authentication code are the same, and if yes, the authentication code is correct, or if not, the authentication code is incorrect. If the authentication code is incorrect, no further determining needs to be performed on the face image and the reference image, or a determining result made by the second user terminal is discarded. A process of performing the authentication by the second user terminal is as follows: the face image and the reference image are determined under the premise that the input authentication code is correct. A determining content is whether faces in the two images are the same, and if yes, an authentication result indicates that the authentication succeeds, or if not, an authentication result indicates that the authentication fails.

S704. Preset a time threshold, and determine whether the second user terminal returns an authentication result within the time threshold. If yes, perform S705; otherwise, enable a face authentication algorithm.

A face swiping payment speed of the first user terminal depends on an authentication speed of the second user terminal. However, the authentication speed of the second user terminal is limited by an environment or an application scenario, for example, an online user of the second user terminal is not in a scenario of receiving the authentication code, or the Internet is not smooth. Further, the authentication speed of the second user terminal is affected by a subjective factor of a user on the second user terminal, for example, the user of the second user terminal does not submit the authentication result in time. In conclusion, the time threshold needs to be set to ensure timeliness of face swiping payment of the first user terminal. Assuming that the set time threshold is 60 seconds, an authentication result returned by the second user terminal within 60 seconds is a valid result, and an authentication result returned by the second user terminal beyond 30 seconds is an invalid result. The valid result is used and the invalid result is discarded.

If a quantity of valid authentication results returned within the time threshold is 0, login is performed by using password authentication. A system in which the first user terminal is located prompts a to-be-logged in user to input a login password. The system receives the to-be-authenticated input password and compare whether the input password and a registered login password are the same, and if yes, the login is successful; or if not, the login fails.

S705. Receive the authentication result returned by the second user terminal.

The second user terminal returns the valid authentication result within the time threshold, and the user of the first user terminal generates a subsequent operation according to the received authentication result. If the authentication result indicates that the authentication succeeds, a face swiping login of the user of the first user terminal succeeds; and if the authentication result indicates that the authentication fails, the face swiping login of the user of the first user terminal fails.

For ease of description, the foregoing method embodiments are described as a series of action combination. However, a person of ordinary skill in the art may know that this application is not limited to the order of the described actions, because according to this application, some steps may be performed in other orders or performed simultaneously. Secondarily, a person skilled in the art may also know that the embodiments described in the specification all belong to embodiments and the involved actions and modules are not necessary for this application.

Based on the foregoing descriptions of the implementations, a person skilled in the art may clearly understand that the foregoing embodiment methods may be implemented by software in addition to universal hardware or by hardware only. In most circumstances, the former is an implementation. Based on such an understanding, the technical solutions of this application or the part that makes contributions to the existing technology may be substantially embodied in the form of a software product. The computer software product is stored in a storage medium (for example, a ROM/RAM, a magnetic disk, or an optical disc), and contains several instructions for instructing a terminal device (which may be a mobile phone, a computer, a server, or a network device) to perform the method according to the embodiments of this application.

Figure 8:
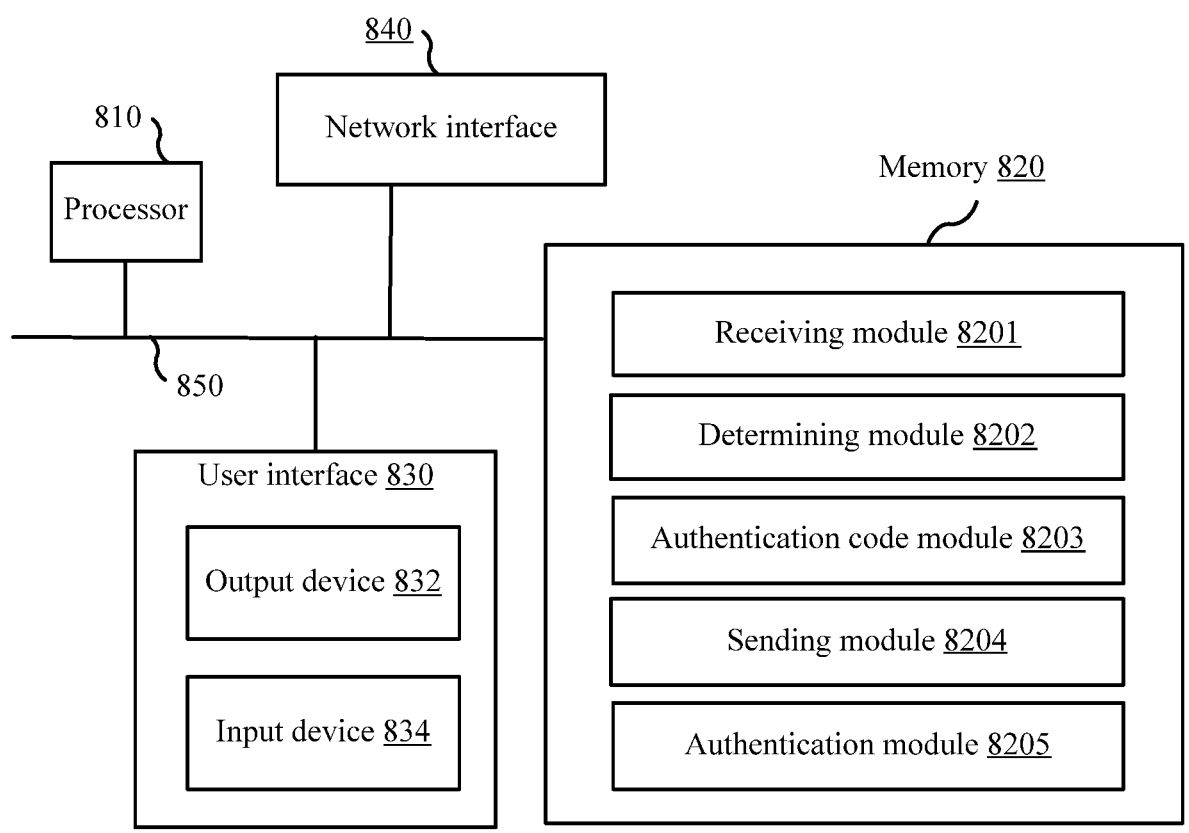
FIG. 8 is a schematic structural diagram of a face authentication apparatus according to an embodiment.

FIG. 8 is a schematic structural diagram of a face authentication apparatus according to an embodiment. The face authentication apparatus includes one or more processors (CPU) 810, a memory 820, a user interface 830, a network interface 840, and a communications bus 850 used to interconnect these components.

In some embodiments, the network interface 840 may be connected, by using one or more networks, to a server configured to provide a data service.

The user interface 830 includes one or more output devices 832. The one or more output devices 832 include one or more visual displays. The user interface 830 further includes one or more input devices 834. The input devices 834 include, for example, a keyboard, a mouse, or another input button or control.

The memory 820 may be a high speed random access memory such as a DRAM, an SRAM, a DDR RAM, or another random access solid-state storage device; or may be a non-volatile memory such as one or more disk storage devices, disc storage devices, flash devices, or another non-volatile solid-state memory.

The memory 820 stores a machine readable instruction module, and the machine readable instruction module includes:

a receiving module 8201, configured to receive a user account and a to-be-authenticated face image that are sent by a first user terminal;

a determining module 8202, configured to: obtain a reference image corresponding to the user account, the reference image being a prestored face image corresponding to the user account; and determine a second user terminal for helping the first user terminal complete face authentication, the second user terminal being in a state of waiting to receive an authentication code;

an authentication code module 8203, configured to generate the authentication code;

a sending module 8204, configured to send the authentication code, the face image, and the reference image to the second user terminal, the second user terminal completing identity authentication of the second user terminal according to the authentication code, and feeding back an authentication result for the face image and the reference image, and the authentication result including: the authentication succeeds or the authentication fails; and an authentication module 8205, configured to: receive the authentication result returned by the second user terminal, and determine, according to the authentication result, whether the face authentication on the first user terminal succeeds.

In some embodiments, the determining module 8202 is further configured to, for second user terminals that have sent request messages but does not receive the authentication code, sort second user terminals in chronological order of the request messages sent by the second user terminal, and select a preset quantity of second user terminals that send request message earliest as second user terminals for helping the first user terminal complete the face authentication.

In some embodiments, the determining module 8204 is further configured to send the authentication code to the second user terminal by using a first message, the receiving module 8201 is further configured to receive a second message fed back by the second user terminal, and the sending module 8204 is further configured to, if an authentication code carried in the second message is the same as the authentication code sent by using the first the message, send the face image and the reference image to the second user terminal by using a third message.

In some embodiments, the authentication module 8205 is further configured to receive authentication results returned by a plurality of second user terminals, collect statistics on a quantity of authentication results indicating that the authentication succeeds in the authentication results returned by the plurality of second user terminals, and if a ratio of the quantity of authentication results indicating that the authentication succeeds to all the authentication results exceeds a preset threshold, determine that the face authentication on the first user terminal succeeds.

In some embodiments, the authentication module 8205 is further configured to use authentication results received by the second user terminals within a preset time length after sending the authentication code as valid authentication results, and collect statistic on a quantity of authentication results indicating that the authentication succeeds in the valid authentication results.

In some embodiments, the authentication module 8205 is further configured to, if a quantity of the received authentication results returned by the second user terminals within the preset time length is 0, perform pre-processing on the to-be-authenticated face image, perform feature extraction, and compare the face image with the reference image according to the extracted feature, to obtain an authentication result.

In some embodiments, the authentication module 8205 is further configured to, if a quantity of the received authentication results returned by the second user terminals within the preset time length is 0, prompt the user to input a password on the first terminal, receive the password sent by the first terminal, and determine, according to the password, whether the authentication on the first user terminal succeeds.

Figure 9:
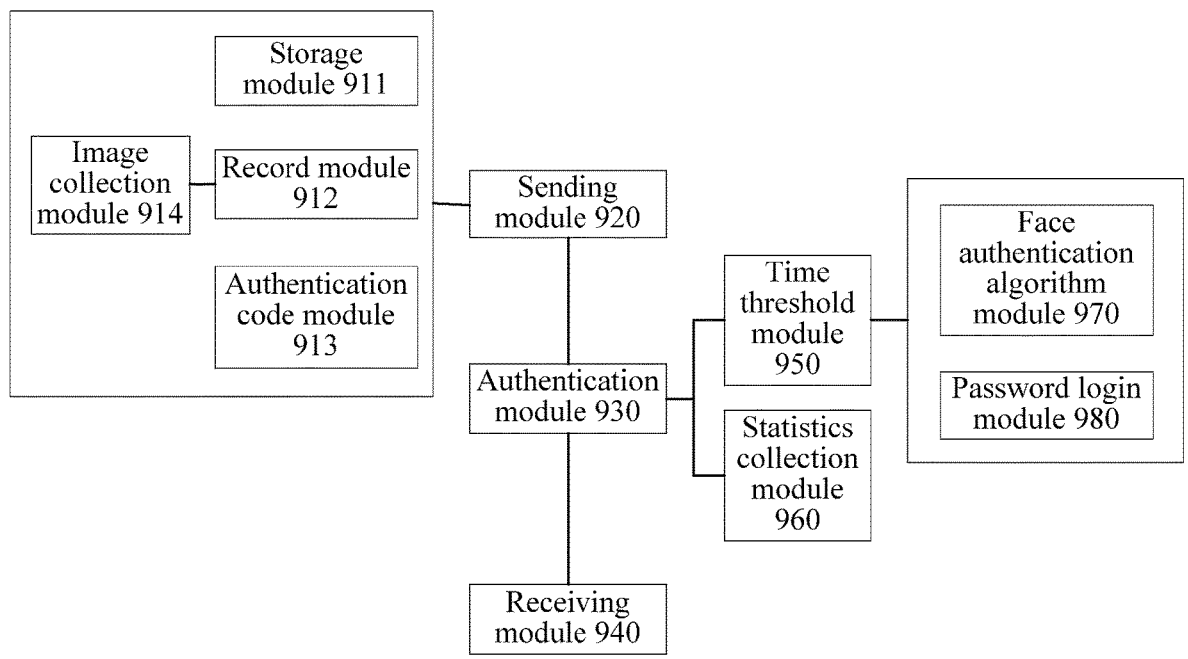
FIG. 9 is an architectural diagram of modules of a face authentication apparatus according to an embodiment.

FIG. 9 is an architectural diagram of modules of a face authentication apparatus according to an embodiment. The apparatus includes the following modules:

a storage module 911, configured to store a login account number registered on a first user terminal and a reference image associated with the login account number;

a record module 912, configured to obtain the login account number on the first user terminal and a to-be-authenticated face image;

an authentication code module 913, configured to generate an authentication code;

a sending module 920, configured to send the authentication code, the face image, and the reference image to a second user terminal;

an authentication module 930, configured to: authenticate the authentication code and determine the face image and the reference image, to generate an authentication result; and a receiving module 940, configured to receive the authentication result of the authentication module.

The apparatus further includes an image collection module 914, configured to collect the reference image and the to-be-authenticated face image.

In an optional embodiment, the face authentication apparatus sends the authentication code, the face image, and the reference image to a plurality of second user terminals. Correspondingly, the apparatus further includes a statistics collection module 960, configured to collect statistics on and compare authentication results returned by the plurality of second user terminals. If the authentication code input by the second user terminal is correct and it is determined that persons in the face image and the reference image are the same, the authentication result indicating that authentication succeeds; otherwise, the authentication result indicates that the authentication fails. A larger quantity of same authentication results is selected as the authentication result.

In another optional embodiment, the face authentication apparatus presets a time threshold to limit a speed of face authentication. Correspondingly, the apparatus further includes a time threshold module 950, configured to delete the authentication result returned by the second user terminal beyond a range of the time threshold.

Feedback is performed according to information of the time threshold module 950. If a feedback result is within the time threshold, a quantity of returned authentication results is 0, authentication and a login need to be performed in another manner.

A first manner is enabling a face authentication algorithm, and the apparatus may be used with reference to another authentication algorithm (such as deep learning). That is, the apparatus further includes a face authentication algorithm module 970, configured to: perform pre-processing on the to-be-authenticated face image, and perform feature extraction, to perform comparison and authentication on the face image and the reference image.

A second manner is enabling a password login. Correspondingly, the apparatus further includes a password login module 980, configured to pre-register a login account number and a corresponding login password, receive a to-be-authenticated input password, and compare whether the input password and the registered login password are the same. If yes, the login is successful, or if not, the login fails.

In conclusion, the face authentication apparatus according to an embodiment of this application combines a registered face image in a database and a current authentication image into an image authentication code, and delivers the image authentication code and a character authentication code together to a real user. If a character authentication code submitted by the real user is correct, determining of the real user on the image authentication code is trusted, that is, a determining result indicating whether persons in the reference image and the current face image are the same is trusted. To avoid uncertainty caused by incorrect identification of a single user, the image authentication code and the character authentication code may be delivered to a plurality of real users. A larger quantity of same authentication results of all the real users is selected as a final result. By the apparatus provided in this embodiment of this application, the accuracy of the face authentication result reaches the identification precision of human beings. In addition, the face authentication result may be provided to a face authentication algorithm for training.

When the face authentication apparatus provided in the foregoing embodiments performs user face authentication, the foregoing division of the functional modules is an example for description. During practical application, the foregoing functions may be allocated to and completed by different functional modules, that is, an inner structure of the apparatus is divided into different functional modules, to complete all or some of the functions described above. In addition, the face authentication apparatus embodiment provided in this embodiment and the face authentication method provided in the foregoing embodiments belong to one concept. For details of an implementation process, refer to the method embodiments.

The method embodiments provided in the embodiments of this application may be performed in a mobile terminal, a computer terminal, or a similar computing apparatus. Using an example in which the method is performed on a computer terminal.

Figure 10:
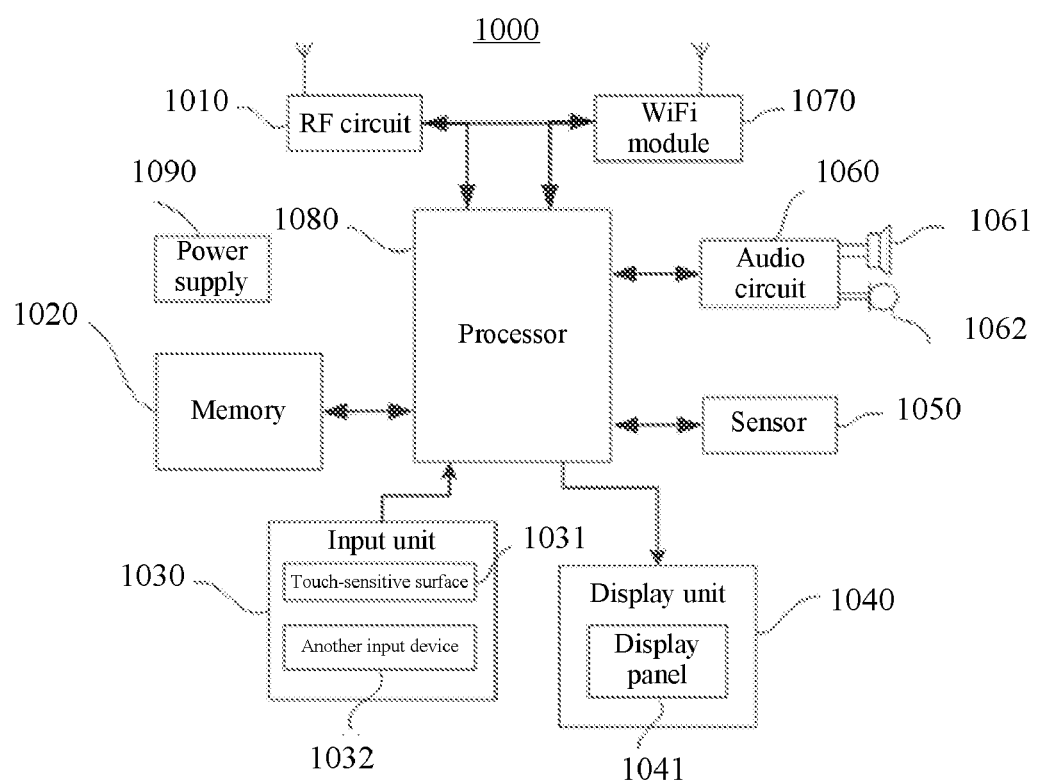
FIG. 10 is a structural diagram of hardware of a computer terminal of a face authentication apparatus according to an embodiment.

FIG. 10 is a structural block diagram of hardware of a computer terminal of a face authentication apparatus according to an embodiment. As shown in FIG. 10, a terminal 1000 may include components such as an RF (Radio Frequency, radio frequency) circuit 1010, a memory 1020 including one or more computer readable storage mediums, an input unit 1030, a display unit 1040, a sensor 1050, an audio circuit 1060, a WiFi (wireless fidelity, wireless fidelity) module 1070, a processor 1080 including one or more processing cores, and a power supply 1090. A person skilled in the art may understand that the structure of the terminal shown in FIG. 10 does not constitute a limitation to the terminal, and the terminal may include more components or fewer components than those shown in the figure, or some components may be combined, or a different component deployment may be used.

The RF circuit 1010 may be configured to receive and send signals during information receiving and sending or during a call. The RF circuit 1010 receives downlink information from a base station, then delivers the downlink information to one or more processors 1080 for processing, and sends related uplink data to the base station. The RF circuit 1010 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 1010 may also communicate with a network and another device by wireless communication. The wireless communication may use any communication standard or protocol, including but not limited to Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 1020 may be configured to store a software program and module. The processor 1080 runs the software program and module stored in the memory 1020, to implement various functional applications and data processing. The memory 1020 may mainly include a program storage area and a data storage area. The program storage area may store an operating system, an application program used by a function (such as a sound playback function and an image display function), and the like. The data storage area may store data (such as audio data and an address book) created according to use of the terminal 1000, and the like. In addition, the memory 1020 may include a high speed random access memory, and may further include a non-volatile memory, such as at least one magnetic disk storage device, a flash memory, or other volatile solid-state storage devices. Correspondingly, the memory 1020 may further include a memory controller, to provide access of the processor 1080 and the input unit 1030 to the memory 1020.

The input unit 1030 may be configured to receive input digit or character information, and generate a keyboard, mouse, joystick, optical or track ball signal input related to the user setting and function control. The input unit 1030 may include a touch-sensitive surface 1031 and another input device 132. The touch-sensitive surface 1031, which is also referred to as a touchscreen or a touch panel, may collect a touch operation of a user on or near the touch-sensitive surface (such as an operation of a user on or near the touch-sensitive surface 1031 by using any suitable object or accessory, such as a finger or a stylus), and drive a corresponding connection apparatus according to a preset program. Optionally, the touch-sensitive surface 1031 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1080. Moreover, the touch controller can receive and execute an instruction sent by the processor 1080. In addition, the touch-sensitive surface 1031 may be a resistive, capacitive, infrared, or surface sound wave type touch-sensitive surface. In addition to the touch-sensitive surface 1031, the input unit 1030 may further include another input device 1032. The another input device 1032 may include, but is not limited to: one or more of a physical keyboard, a functional key (such as a volume control key or a switch key), a track ball, a mouse, and a joystick.

The display unit 1040 may be configured to display information input by the user or information provided to the user, and various graphical user interfaces of the terminal 1000. The graphical user interfaces may be composed of graphics, text, icons, videos, and any combination thereof. The display unit 1040 may include a display panel 1041. Optionally, the display panel 1041 may be configured by using a liquid crystal display (LCD), an organic light-emitting diode (OLED), or the like. Further, the touch-sensitive surface 1031 may cover the display panel 1041. After detecting a touch operation on or near the touch-sensitive surface 1031, the touch-sensitive surface 1041 transfers the touch operation to the processor 1080, to determine the type of the touch event. Then, the processor 1080 provides a corresponding visual output on the display panel 1041 according to the type of the touch event. Although, in FIG. 10, the touch-sensitive surface 1031 and the display panel 1041 are used as two separate parts to implement input and output functions, in some embodiments, the touch-sensitive surface 1031 and the display panel 1041 may be integrated to implement the input and output functions.

The terminal 1000 may further include at least one sensor 1050 such as an optical sensor, a motion sensor, and other sensors. The optical sensor may include an ambient light sensor and a proximity sensor. The ambient light sensor may adjust luminance of the display panel 1041 according to brightness of the ambient light. The proximity sensor may switch off the display panel 1041 and/or backlight when the terminal 1000 is moved to the ear. As one type of motion sensor, a gravity acceleration sensor may detect magnitude of accelerations in various directions (e.g., on three axes), may detect magnitude and a direction of the gravity when static, and may be applied to an application that recognizes the attitude of the terminal (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor may be configured in the terminal 1000.

The audio circuit 1060, a speaker 1061, and a microphone 1062 may provide audio interfaces between the user and the terminal 1000. The audio circuit 1060 may convert received audio data into an electric signal and transmit the electric signal to the speaker 161. The speaker 1061 converts the electric signal into a sound signal for output. On the other hand, the microphone 1062 converts a collected sound signal into an electric signal. The audio circuit 1060 receives the electric signal and converts the electric signal into audio data, and outputs the audio data to the processor 1080 for processing. Then, the processor 1080 sends the audio data to, for example, another terminal by using the RF circuit 1010, or outputs the audio data to the memory 1020 for further processing. The audio circuit 1060 may further include an earplug jack, to provide communication between a peripheral earphone and the terminal 1000.

WiFi is a short distance wireless transmission technology. The terminal 1000 may help, by using the WiFi module 1070, the user to receive and send e-mails, browse a web page, access streaming media, and so on, which provides wireless broadband Internet access to the user. Although FIG. 10 shows the WiFi module 1070, it may be understood that the WiFi module is not a necessary component of the terminal 1000, and the WiFi module may be omitted as long as the scope of the essence of the disclosure is not changed.

The processor 1080 is the control center of the terminal 1000, and is connected to various parts of the terminal by using various interfaces and lines. By running or executing the software program and/or module stored in the memory 1020, and invoking data stored in the memory 1020, the processor 1080 performs various functions and data processing of the terminal 1000, thereby performing overall monitoring on the terminal. Optionally, the processor 1080 may include one or more processing cores. In some embodiments, the processor 1080 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1080.

The terminal 1000 further includes the power supply 1090 (such as a battery) for supplying power to the components. The power supply may be logically connected to the processor 1080 by using a power management system, thereby implementing functions such as charging, discharging, and power consumption management by using the power management system. The power supply 1090 may further include one or more of any component such as a direct current or alternating current power supply, a re-charging system, a power failure detection circuit, a power supply converter or inverter, or a power supply state indicator.

The terminal 1000 may further include a camera, a Bluetooth module, and the like. In this embodiment, the display unit of the terminal is a touchscreen display, and the terminal further includes a memory and one or more programs. The one or more programs are stored in the memory, and are configured to be executed by the one or more processors. The one or more programs include instructions for performing the following operations:

receiving a user account and a to-be-authenticated face image that are sent by a first user terminal;

obtaining a reference image corresponding to the user account, the reference image being a prestored face image corresponding to the user account;

determining a second user terminal for helping the first user terminal complete face authentication, the second user terminal being in a state of waiting to receive an authentication code;

generating the authentication code;

sending the authentication code, the face image, and the reference image to the second user terminal, the second user terminal completing identity authentication according to the authentication code, and feeding back an authentication result for the face image and the reference image, and the authentication result including: the authentication succeeds or the authentication fails; and receiving the authentication result returned by the second user terminal, and determining, according to the authentication result, whether the face authentication on the first user terminal succeeds.

Based on the foregoing descriptions of the implementations, a person skilled in the art may clearly understand that the face authentication technical solutions provided in this application may be implemented by software in addition to an universal hardware platform or by hardware only. In most circumstances, the former is an implementation. Based on such an understanding, the technical solutions of this application or the part that makes contributions to the existing technology may be substantially embodied in the form of a software product. The computer software product is stored in a storage medium (for example, a ROM/RAM, a magnetic disk, or an optical disc), and contains several instructions for instructing a terminal device (which may be a mobile phone, a computer, a server, or a network device) to perform the method according to the embodiments of this application.

An embodiment of this application provides a computer readable storage medium. The computer readable storage medium may be a computer readable storage medium included in the memory in the foregoing embodiment; or may be computer readable storage medium that exists alone and that is not assembled to a terminal. The computer readable storage medium stores one or more programs. The one or more programs are executed by one or more processors to execute the foregoing face authentication method. The method includes:

obtaining a to-be-authenticated face image and a reference image from a first client;

generating an authentication code corresponding to the face image and the reference image;

sending the authentication code, the face image, and the reference image to a second client for authentication; and receiving an authentication result returned by the second client.

Further, before the obtaining a to-be-authenticated face image and a reference image, the method further includes obtaining a login account number corresponding to the to-be-authenticated face image.

The obtaining a to-be-authenticated face image and a reference image includes presetting an associated reference image for the login account number, and obtaining the associated reference image by using the obtained login account number.

In some embodiments, the sending the authentication code, the face image, and the reference image to a second client for authentication includes authenticating whether an authentication code input by the second client is correct, if yes, receiving a determining result made by the second client, and otherwise, deleting a determining result made by the second client, in which if the determining result made by the second client is deleted, the authentication result returned by the second client indicates that the authentication fails.

The determining result made by the second client includes determining, by the second client, whether persons in the face image and the reference image are the same, and if a determining result is that the persons in the face image and the reference image are the same, the authentication result returned by the second client indicates that the authentication succeeds. Alternatively, if a determining result is that the persons in the face image and the reference image are different, the authentication result returned by the second client indicates that the authentication fails.

In some embodiments, the authentication code, the face image, and the reference image are sent to a plurality of second clients for authentication. Each second client returns an authentication result, and the authentication result indicates that the authentication succeeds and the authentication fails. Authentication results returned by the plurality of second clients are collected, and a larger quantity of same authentication results is selected as the authentication result.

Further, the method further includes setting a time threshold and deleting an authentication result returned by the second client beyond a range of the time threshold.

In some embodiments, if a quantity of authentication results returned by the second client within the time the threshold is 0, the following two standby manners may be selected:

a first standby manner is enabling a face authentication algorithm, including performing pre-processing on the to-be-authenticated face image and performing feature extraction, to perform comparison and authentication on the face image and the reference image; and a second standby manner is enabling a password login, including pre-registering a login account number and a corresponding login password, receiving a to-be-authenticated input password and comparing whether the input password and the registered login password are the same, if yes, the login is successful, otherwise, the login fails.

The obtaining a to-be-authenticated face image includes receiving the to-be-authenticated face image collected by a camera.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

The foregoing descriptions are embodiments of this application, but are not intended to limit this application. Any modification, equivalent replacement, or improvement made within the spirit and principle of this application shall fall within the protection scope of this application.

What is claimed is:

1. A face authentication method being performed by at least one processor of a server, and the method comprising:

receiving, by the server, from a first user terminal, a user account and a face image;

obtaining, by the server, a reference image corresponding to the received user account, the reference image being prestored;
determining, by the server, a second user terminal for helping the first user terminal complete face authentication of the face image with the reference image, the second user terminal being in a state of waiting to receive a first authentication code for the second user terminal to complete identity authentication of the first user terminal;
generating, by the server, the first authentication code;
sending, by the server, to the second user terminal, the generated first authentication code;
receiving, by the server, from the second user terminal, a second authentication code;
sending, by the server, to the second user terminal, the received face image and the obtained reference image in response to the received second authentication code being determined to be the same as the sent first authentication code;
receiving, by the server, from the second user terminal, a result of the face authentication of the sent face image with the sent reference image, the result indicating whether the face authentication succeeds; and
authenticating, by the server, the face image based on the received result of the face authentication,
wherein the determining the second user terminal comprises:
for a plurality of user terminals that sent request messages to the server but have not receive the first authentication code, sorting the plurality of user terminals in chronological order at which the request messages were sent; and
selecting one of a preset quantity of the plurality of user terminals that sent request message earliest, as the second user terminal for helping the first user terminal complete the face authentication.

2. The method according to claim 1, further comprising:
receiving, from the plurality of user terminals, a plurality of results of the face authentication of the face image with the reference image; and
collecting a quantity of the plurality of results indicating that the face authentication succeeds,
wherein the determining whether the face authentication succeeds comprises, based on a ratio of the quantity of the plurality of results indicating that the face authentication succeeds to all of the plurality of results exceeding a preset threshold, determining that the face authentication succeeds.

3. The method according to claim 2, wherein the collecting the quantity of the plurality of results indicating that the face authentication succeeds comprises collecting the quantity of the plurality of results indicating that the face authentication succeeds, the plurality of results being received within a preset time length after the sending the first authentication code.

4. The method according to claim 3, wherein, based on the quantity of the plurality of results received within the preset time length being 0:
performing pre-processing on the face image;
extracting a feature from the face image that is pre-processed; and
comparing the face image with the reference image, based on the feature that is extracted, to obtain the result of the face authentication.

5. The method according to claim 3, wherein, based on the quantity of the plurality of results received within the preset time length being 0:
prompting a user to input a password on the first user terminal;
receiving the password from the first user terminal; and
determining, based on the password, whether the face authentication succeeds.

6. A face authentication apparatus comprising:
at least one memory configured to store computer program code; and
at least one processor configured to access the at least one memory and operate according to the computer program code, the computer program code comprising:
receiving code configured to cause the at least one processor to receive, from a first user terminal, a user account and a face image;
determining code configured to cause the at least one processor to:
obtain a reference image corresponding to the received user account, the reference image being prestored; and
determine a second user terminal for helping the first user terminal complete face authentication of the face image with the reference image, the second user terminal being in a state of waiting to receive a first authentication code for the second user terminal to complete identity authentication of the first user terminal;
authentication code generating code configured to cause the at least one processor to generate the first authentication code;
sending code configured to cause the at least one processor to send, to the second user terminal, the generated first authentication code,
wherein the receiving code is further configured to cause the at least one processor to receive, from the second user terminal, a second authentication code, and the sending code is further configured to cause the at least one processor to send, to the second user terminal, the received face image and the obtained reference image in response to the received second authentication code being determined to be the same as the first authentication code; and
authentication code configured to cause the at least one processor to:
receive, from the second user terminal, a result of the face authentication of the sent face image with the sent reference image, the result indicating whether the face authentication succeeds; and
authenticate, based on the received result of the face authentication, the face image,
wherein the determining code is further configured to cause the at least one processor to:
for a plurality of user terminals that sent request messages to a server but have not receive the first authentication code, sort the plurality of user terminals in chronological order at which the request messages were sent; and
select one of a preset quantity of the plurality of user terminals that sent request message earliest, as the second user terminal for helping the first user terminal complete the face authentication.

7. The apparatus according to claim 6, wherein the authentication code is further configured to cause the at least one processor to:
receive, from the plurality of user terminals, a plurality of results of the face authentication of the face image with the reference image;

collect a quantity of the plurality of results indicating that the face authentication succeeds; and based on a ratio of the quantity of the plurality of results indicating that the face authentication succeeds to all of the plurality of results exceeding a preset threshold, determine that the face authentication succeeds.

8. The apparatus according to claim 7, wherein the authentication code is further configured cause the at least one processor to collect the quantity of the plurality of results indicating that the face authentication succeeds, the plurality of results being received within a preset time length after the sending the first authentication code.

9. The apparatus according to claim 8, wherein the authentication code is further configured to cause the at least one processor to, based on the quantity of the plurality of results received within the preset time length being 0:

perform pre-processing on the face image;

extract a feature from the face image that is pre-processed; and compare the face image with the reference image, based on the feature that is extracted, to obtain the result of the face authentication.

10. The apparatus according to claim 8, wherein the authentication code is further configured to cause the at least one processor to, based on the quantity of the plurality of results received within the preset time length being 0:

prompt a user to input a password on the first user terminal;

receive the password from the first user terminal; and determine, based on the password, whether the face authentication succeeds.

11. A non-transitory computer-readable storage medium storing instructions that cause at least one processor of a server to:

receive, from a first user terminal, a user account and a face image;

obtain a reference image corresponding to the received user account, the reference image being prestored;

determine a second user terminal for helping the first user terminal complete face authentication of the face image with the reference image, the second user terminal being in a state of waiting to receive a first authentication code for the second user terminal to complete identity authentication of the first user terminal;

generate the first authentication code;

send, to the second user terminal, the generated first authentication code;

receive, from the second user terminal, a second authentication code;

send, to the second user terminal, the received face image and the obtained reference image in response to the received second authentication code being determined to be the same as the first authentication code;

receive, from the second user terminal, a result of the face authentication of the sent face image with the sent reference image, the result indicating whether the face authentication succeeds; and authenticate, based on the received result of the face authentication, the face image whether, wherein the instructions further cause the at least one processor to:

for a plurality of user terminals that sent request messages to the server but have not receive the first authentication code, sort the plurality of user terminals in chronological order at which the request messages were sent; and select one of a preset quantity of the plurality of user terminals that sent request message earliest, as the second user terminal for helping the first user terminal complete the face authentication.

12. The non-transitory computer-readable storage medium according to claim 11, wherein the instructions further cause the at least one processor to:

receive, from the plurality of user terminals, a plurality of results of the face authentication of the face image with the reference image;

collect a quantity of the plurality of results indicating that the face authentication succeeds; and based on a ratio of the quantity of the plurality of results indicating that the face authentication succeeds to all of the plurality of results exceeding a preset threshold, determine that the face authentication succeeds.

13. The non-transitory computer-readable storage medium according to claim 12, wherein the instructions further cause the at least one processor to collect the quantity of the plurality of results indicating that the face authentication succeeds, the plurality of results being received within a preset time length after the sending the first authentication code.

14. The non-transitory computer-readable storage medium according to claim 13, wherein the instructions further cause the at least one processor to, based on the quantity of the plurality of results received within the preset time length being 0:

perform pre-processing on the face image;

extract a feature from the face image that is pre-processed; and compare the face image with the reference image, based on the feature that is extracted, to obtain the result of the face authentication.

\* \* \* \* \*